(12) United States Patent
Olesen et al.

(10) Patent No.: US 10,436,673 B2
(45) Date of Patent: Oct. 8, 2019

(54) METHOD AND A DEVICE FOR DETERMINING TORSIONAL DEFORMATION IN A DRIVETRAIN

(71) Applicant: VESTAS WIND SYSTEMS A/S, Aarhus N (DK)

(72) Inventors: Ib Svend Olesen, Randers (DK); Dan Hilton, Gjern (DK); Johnny Nielsen, Svenstrup (DK); Kristian Kiib, Skødstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/580,397

(22) PCT Filed: Jun. 17, 2016

(86) PCT No.: PCT/DK2016/050199
§ 371 (c)(1),
(2) Date: Dec. 7, 2017

(87) PCT Pub. No.: WO2017/000949
PCT Pub. Date: Jan. 5, 2017

(65) Prior Publication Data
US 2018/0164183 A1 Jun. 14, 2018

(30) Foreign Application Priority Data

Jun. 30, 2015 (DK) .................. 2015 70419

(51) Int. Cl.
| | | |
|---|---|---|
| G01M 13/00 | (2019.01) | |
| G01M 13/02 | (2019.01) | |
| F03D 7/00 | (2006.01) | |
| F16H 59/14 | (2006.01) | |
| G01B 21/32 | (2006.01) | |
| G01L 5/26 | (2006.01) | |

(Continued)

(52) U.S. Cl.
CPC .............. *G01M 13/02* (2013.01); *F03D 7/00* (2013.01); *F03D 7/0224* (2013.01); *F03D 17/00* (2016.05);
(Continued)

(58) Field of Classification Search
CPC ........ G01M 13/02; F03D 7/00; F03D 7/0224; F16H 59/14; F16H 59/141; F16H 59/46;
(Continued)

(56) References Cited

U.S. PATENT DOCUMENTS

| | | |
|---|---|---|
| 4,193,005 A | 3/1980 | Kos et al. |
| 5,729,454 A | 3/1998 | Amsallen |

(Continued)

FOREIGN PATENT DOCUMENTS

| | | |
|---|---|---|
| EP | 0008584 A1 | 3/1980 |
| EP | 0651181 A1 | 5/1995 |

(Continued)

OTHER PUBLICATIONS

PCT Written Opinion of the International Searching Authority for Application No. PCT/DK2016/050199 dated Jun. 17, 2016.
(Continued)

*Primary Examiner* — Max H Noori
(74) *Attorney, Agent, or Firm* — Patterson + Sheridan, LLP

(57) ABSTRACT

A method of determining torsional deformation in a drivetrain e.g. of a wind turbine. To provide a reliable and simple deformation assessment, the method comprises the step of generating a first signal representing first rotational speed of a low speed shaft, generating a second signal representing the second rotational speed of a high speed shaft, and determining torsional deformation based on changes in the ratio between the first and second signals.

18 Claims, 5 Drawing Sheets

(51) Int. Cl.
*G01L 1/04* (2006.01)
*G01L 3/10* (2006.01)
*F03D 17/00* (2016.01)
*F03D 7/02* (2006.01)
*F16H 59/46* (2006.01)

(52) U.S. Cl.
CPC ........... *F16H 59/14* (2013.01); *F16H 59/141* (2013.01); *G01B 21/32* (2013.01); *G01L 1/048* (2013.01); *G01L 3/109* (2013.01); *G01L 5/26* (2013.01); *F05B 2270/327* (2013.01); *F16H 59/46* (2013.01); *Y02E 10/722* (2013.01); *Y02E 10/723* (2013.01)

(58) Field of Classification Search
CPC ......... G01B 21/32; G01L 1/048; G01L 3/109; G01L 5/26; F05B 2270/327; Y02E 10/722; Y02E 10/723
USPC .................................................... 73/862.325
See application file for complete search history.

(56) References Cited

U.S. PATENT DOCUMENTS

| | | | |
|---|---|---|---|
| 9,431,944 B2* | 8/2016 | Gregg | .................. F03D 7/0272 |
| 2006/0048585 A1 | 3/2006 | Meissner | |
| 2006/0225520 A1 | 10/2006 | Heinzelmann | |
| 2009/0193894 A1 | 8/2009 | Kabatzke | |
| 2010/0133828 A1 | 6/2010 | Stegemann et al. | |
| 2011/0089693 A1 | 4/2011 | Nasiri | |
| 2013/0170988 A1* | 7/2013 | Guey | .................... F03D 7/0224 416/9 |
| 2014/0375055 A1 | 12/2014 | Moerbe et al. | |
| 2015/0177022 A1 | 6/2015 | Vath et al. | |
| 2017/0082188 A1* | 3/2017 | McKimpson | ........... F16H 57/01 |

FOREIGN PATENT DOCUMENTS

| | | |
|---|---|---|
| EP | 1832743 A1 | 9/2007 |
| WO | 2014149364 A1 | 9/2014 |
| WO | 2017000949 A1 | 1/2017 |

OTHER PUBLICATIONS

Danish Patent and Trademark Office Search Report for Application No. PA 2015 70419 dated Jan. 14, 2016.

International Search Report for Application No. PCT/DK2016/050199 dated Jun. 17, 2016.

Chinese Office Action for Application No. 201680037729.3 dated Dec. 21, 2018.

* cited by examiner

METHOD AND A DEVICE FOR DETERMINING TORSIONAL DEFORMATION IN A DRIVETRAIN

The invention relates to a method and a device for determining torsional deformation in a drivetrain of the kind which includes a first shaft and a second shaft. The first shaft and second shaft is connected by a gearbox which provides fixed ratio between the rotational speed of the first shaft, herein the first rotational speed, and the rotational speed of second shaft, herein the second rotational speed. Particularly, the invention relates to deformation in drivetrains of wind turbines.

BACKGROUND

A transmission with overload protection is known, e.g. in the form of torque measuring systems having a torque transducer including a measuring rod with a strain gauge.

Sometimes, strain gauge measurements involve the use of a slip ring assembly for fixing a transmission part to a rotating shaft. The use of slip rings for transmission of measured values is associated with high costs. In addition, the slip rings are subject to wear.

Other kinds of mechanical transducers for torque measurement on transmission components are known, e.g. measuring gears which measure the torsion of the drive shaft based on a small torsion angle or angle of rotation.

Generally, many different mounting sensors are available for measuring torque in the main shaft of a drivetrain. Typically, the known sensors are complex, fragile, and expensive

SUMMARY

It is an object of the invention to provide a simple and cost effective solution for determining torque, and to provide a solution which mainly utilizes the equipment which often is mounted already in connection with a drivetrain in a wind turbine or in drivetrains for other purposes.

According to a first aspect, the invention provides a method of determining torsional deformation in a drivetrain e.g. of a wind turbine where a first signal representing the first rotational speed and a second signal representing the second rotational speed are generated and torsional deformation is determined based on the first and second signals, e.g. based on a ratio between the first and second signals.

The ratio between the first shaft and the second shaft is generally fixed by the engaging teeth in the gearbox. This is normally referred to as a gearbox ratio. The first shaft could e.g. be a high speed shaft, and the second shaft could be a low speed shaft on opposite sides of the gearbox.

Any variation in the ratio can therefore only be the result of deformation within the drivetrain, e.g. within the gearbox. Such deformation of the drivetrain is proportional with the torque.

The solution according to the invention only requires sensor signals for speed sensing. Often such signals already exist, and the invention therefore provides a simple and reliable solution which can typically be implemented in a cost efficient manner.

The method may comprise the step of generating a third signal based on the first and second signals, and comparing the third signal with a reference signal. Particularly, the third signal may constitute a mixing of the first and second signals.

Generally, the first, second and third signals may each represent a frequency, i.e. a frequency related to the first shaft, a frequency related to second shaft and a frequency related to the combined, third, signal.

The terms first and second shafts may be understood broadly to simply distinguish one point in the drivetrain from another point in the drivetrain.

The third signal may be obtained by ex-or on the first and second signals or by similar methods of signal combination.

The third signal will represent a frequency which is essentially constant relative to the first shaft and second shaft frequency as long the relation between the first shaft and the second shaft rotational speed is fixed.

If the second shaft rotational speed appears to be increasing (or decreasing) relative to the first shaft rotational speed, this can only be the result of deformation of the drivetrain, which must be the result of change of the torque.

If the relation between first shaft and second shaft rotational speed changes, the mixed frequency will change, even if it is only for a short moment. Thus changes in the mixed frequency will indicate changes in the torque in the drivetrain.

Accordingly, the method may comprise the step of detecting a change in a frequency which is represented by the third signal.

The change in frequency only exists while the torque is changing. Once the torque is constant the frequency is fixed again, but not the phase of the mixed signal—the phase has moved. This change in phase indicates the amount of torque, while the change frequency indicates the changing of the torque.

Accordingly, the method may comprise the step of detecting a phase shift in the third signal.

The method may further comprise the step of comparing the third signal with a reference signal, and the reference signal may particularly be based on at least one of the first and the second signals. When the frequency represented in the third signal is evaluated relative to either the first shaft frequency or the second shaft frequency, any general changes in the speed of the drivetrain speed will not affect the evaluation, and the evaluation can become more exact.

An additional advantage of comparing the third signal with one of the first and second signals is that instead of measuring directly on many short pulses which may vary in width and timing, measuring is based on a filtered sine-like curve, which still gives accurate and reliable information of the forces in the drive train, e.g. inside the gearbox.

The relation could for example be 123.4567 first signal pulses for each full period (cycle) of the third signal. It can thereby be measured if the third signal period lasted a different number of cycles.

The comparing of the third signal with a reference value could be carried out continuously, and at least one of the first and second signals could be determined as an average of a plurality of measurements.

At least one of the first, second, and third signal could be further filtered, e.g. by use of a low-pass filter or a band-pass filter.

In one embodiment, the method comprises a first step of determining, at a first point in time, a first ratio of the first shaft rotational speed to the second shaft rotational speed. The method may further comprise a second step of determining, at a second point in time, a second ratio of the first rotational speed to the second rotational speed. In a third step a value representing a difference between the first ratio and the second ratio is provided, and in a fourth step, the value is compared with a reference value.

The first to the fourth step could be repeated continuously.

The first and second signals could particularly be generated by use of any device that produces pulses, e.g. a pole-band on the first and second shafts. The pole-band could be in communication with a processor or controller which provides the above mentioned signal processing and evaluation of the torque. The pole-band may generate a signal on a sensor, e.g. a signal being in the area of 100-300 times higher than the rotational speed of second shaft.

A pole-band or taco on the first shaft may, likewise, generate a signal which may be in the area of 10-100 times higher than the first shaft rotational speed. This signal may need to be modified, e.g. by division, so it has almost the same frequency as the signal from the second shaft. The resulting two signals thereby have almost—but not exactly—the same frequency.

As an alternative to a pole-band sensor, the method may use any other device which can produce pulses, e.g. a taco.

At least one of the first, second, and third signal may be determined during power production by the wind turbine, and the signals may be used for controlling the input or output torque, for instance by pitching the blades or changing the counter torque from the generator, e.g. for changing the power production, e.g. for de-rating or stopping the wind turbine. Alternatively or additionally, the signals may be combined with signals elsewhere in the wind turbine or with signals from other wind turbines, e.g. for monitoring yield or for rating a wind turbine location relative to other locations. The signals may also be used for predictive maintenance, i.e. to predict wear and provide suitable inspection intervals for a wind turbine.

In a second aspect, the invention provides a wind turbine comprising a drivetrain with a high speed shaft (HS) and a low speed shaft (LS), the first shaft (e.g. HS) and second shaft (e.g. LS) being connected by a transmission providing a nominal ratio between a first shaft rotational speed of first shaft and a second shaft rotational speed of the second shaft. The wind turbine according to the second aspect further comprises a controller configured to operate in accordance with the method of the first aspect of the invention.

In further aspects, the invention relates to a controller for a wind turbine configured to operate in accordance with the method of the first aspect of the invention, and to a controller for a wind turbine configured to control input or output torque for instance by pitching the blades or changing the counter torque from the generator of the wind turbine, e.g. to shut down the wind turbine, based on the determined torsional deformation or based on variations in the torsional deformation.

DETAILED DESCRIPTION

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
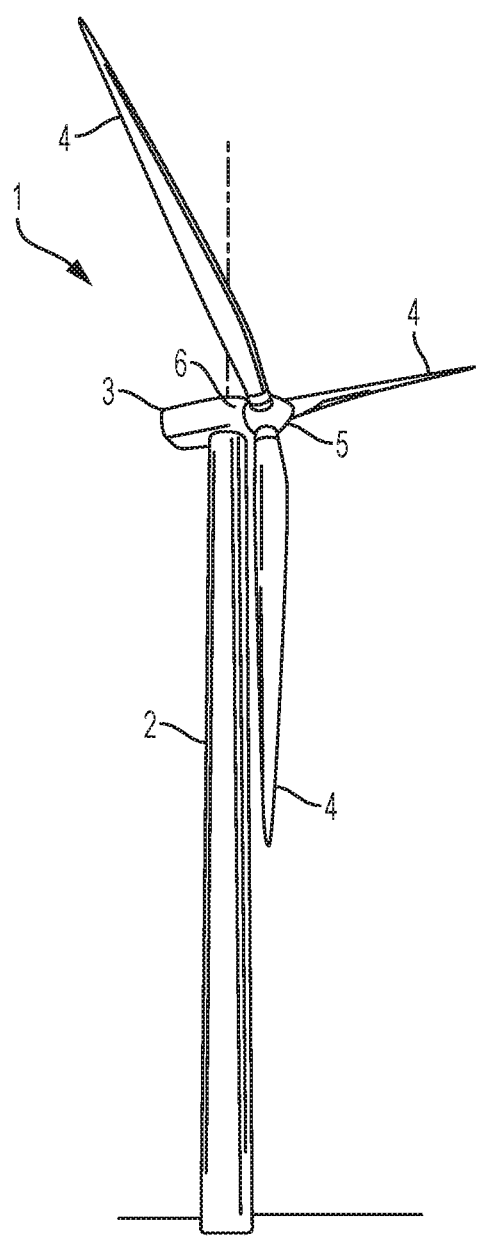
FIG. 1 illustrates a wind turbine with a controller embedded in the nacelle.

FIG. 1 illustrates a wind turbine 1 with a tower 2, a nacelle 3, and blades 4. The blades are attached to the hub 5 which forms part of the drivetrain 6 located inside the nacelle.

Figure 2:
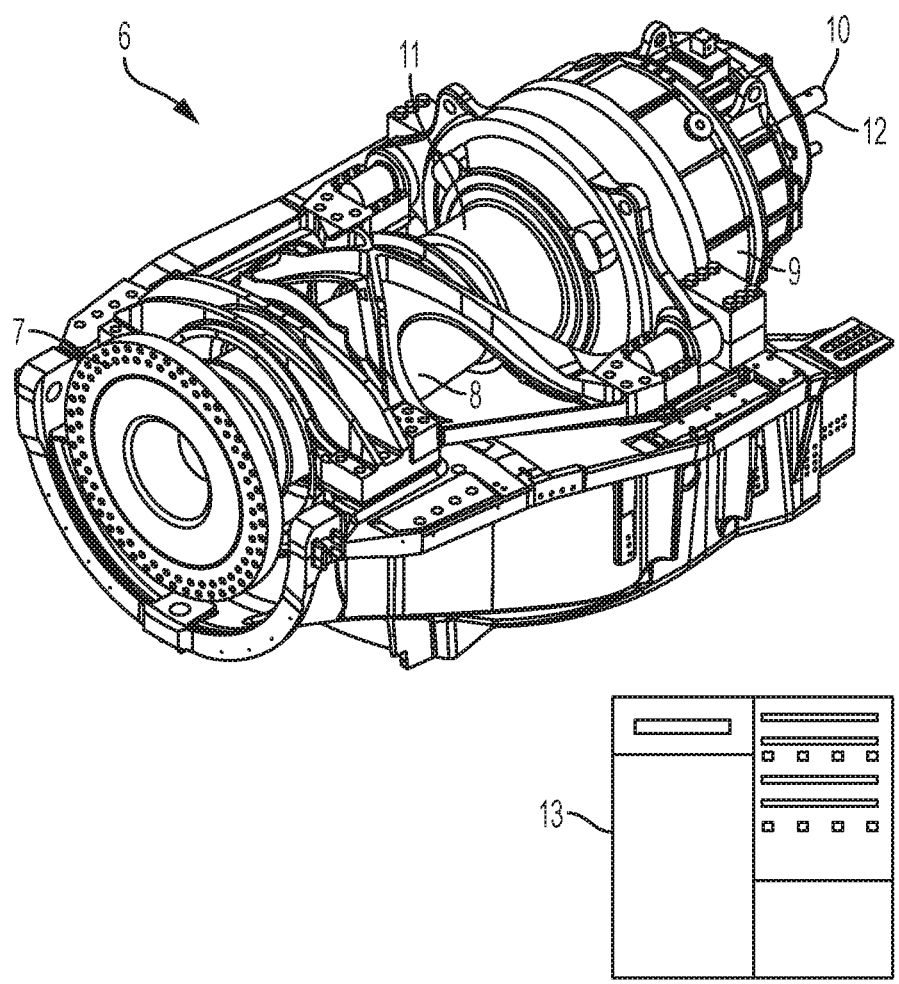
FIG. 2 illustrates a drivetrain in the wind turbine.

FIG. 2 illustrates the drivetrain 6 without the hub 5. The drivetrain comprises a flange 7 for attaching the hub, a shaft 8 connecting the gearbox 9 to the flange 7 and an output 10 for driving e.g. an electrical generator.

The gearbox 9 converts a low speed to high speed such that the generator is driven by the output 10 at a speed which is high relative to the rotational speed of the shaft 8 and hub.

The conversion from the low speed to the high speed is at a fixed ratio which means that in an ideal situation without any deformation in the drivetrain, the ratio between the rotational speed of the shaft 8 and the rotational speed of the shaft 10 would be constant. Herein, the shaft 8 is referred to as second shaft and the shaft 10 is referred to as HS.

Two pole bands 11, 12 are attached to the drivetrain on opposite sides of the gearbox. This allows determination of torsional deformation in the gearbox.

The pole bands communicate with the controller 13, e.g. by wireless. The controller could be housed locally in the nacelle, or it could be constituted by a central computer system communicating with a plurality of wind turbines.

The controller is configured to detect torque and to detect a change in torque applied by the hub to the drivetrain. For this purpose, the controller is configured to combine signals from the two pole bands 11, 12 and to compare the resulting, third signal, with the signal from one of the pole bands. The resulting signal is evaluated and a phase shift and/or a change in frequency is determined.

The controller may further be configured for additional control purpose. The controller may e.g. be configured for changing the power production, e.g. by de-rating the power production or for stopping the wind turbine based on the determined torque or based on variations in the torque. The controller may e.g. be configured for controlling blade pitching.

EXAMPLE

The following example illustrates a situation where the second shaft has 200 pulses per revolution and a phase shift of 0.1 degrees occurs on the second shaft compared the first shaft due to angular deformation.

The pulses from the second shaft will then be shifted 200*0.1°=20° relative to the pulses from the first shaft which will also lead to a phase shift of the mixed, third, signal of 20°. This can be detected either as a phase shift or as a temporary shift in frequency. Thus a small change in the shafts relations, results in a larger change in the third signal.

Figure 3:
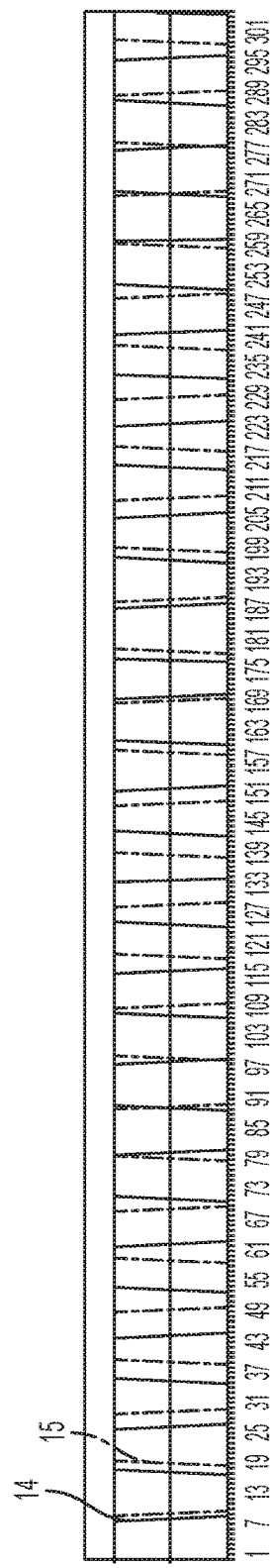
FIG. 3 illustrates the first and second signals obtained from pole bands.

FIG. 3 illustrates two signals. The signal marked 14 is the pulses from the pole band 11 on the hub side of the gearbox, and the signal marked 15 is the pulses from the pole band 12 on the other side of the gearbox.

Figure 4:
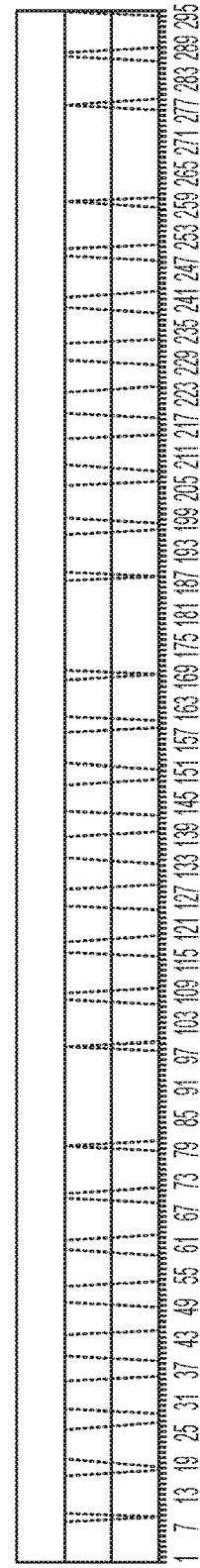
FIG. 4 illustrates the third signal constituting a mix of the first and second signal.

FIG. 4 illustrates the mixed, third, signal. In the disclosed embodiment, the signal is mixed by ex-or. This is a simple way to mix two digital signals, but many other ways may apply.

Figure 5:
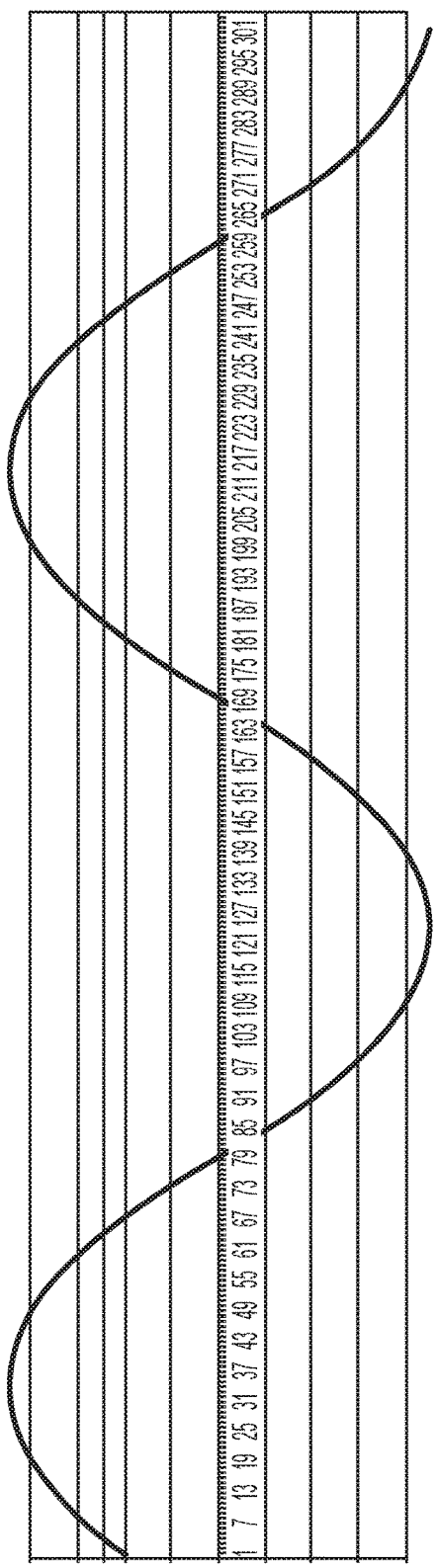
FIG. 5 illustrates the third signal after smoothening.

FIG. 5 illustrates the mixed, third, signal after being smoothed.

Figure 6:
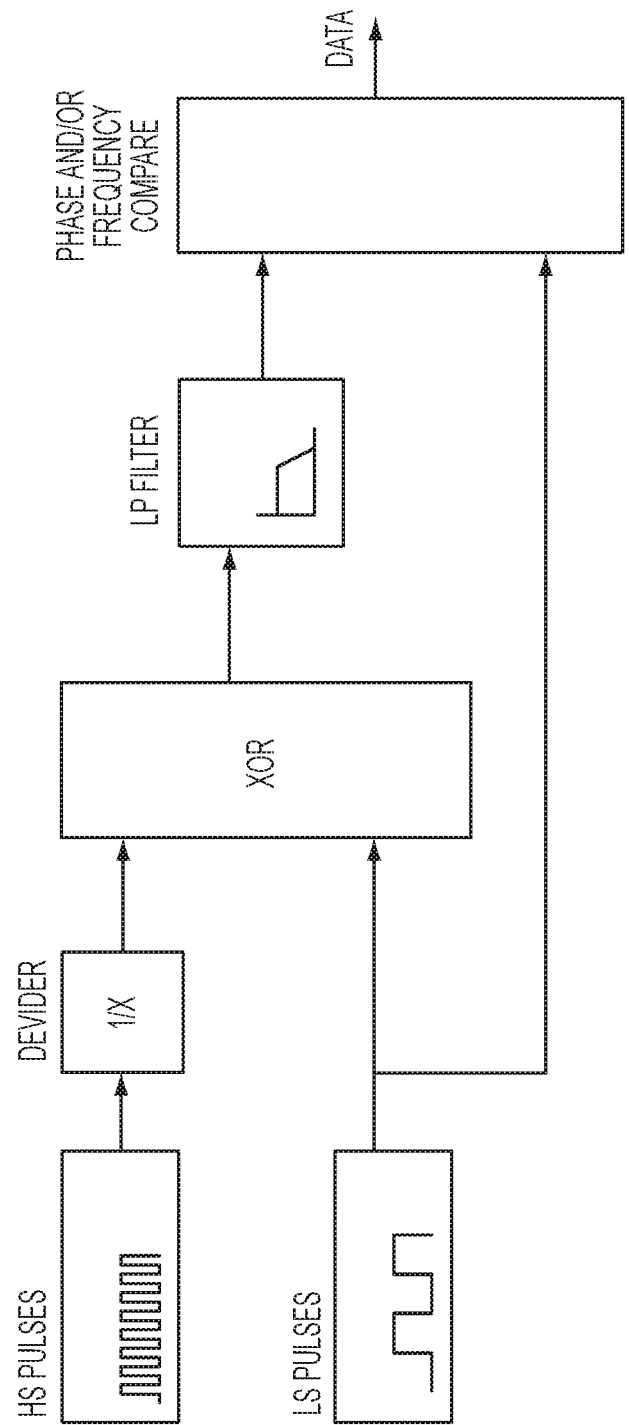
FIG. 6 illustrates the process of mixing the first and the second signals.

FIG. 6 illustrates the process of mixing the first and second signals. In the illustrated example, HS denotes a High speed shaft signal, e.g. the first signal, and LS denotes a low speed shaft signal, e.g. the second signal. In the process called phase and frequency compare, deviations in the phase or frequency is detected to evaluate a change in torque.

Both digital and analogue method can be used for the data and signal processing.

A change in the sine-shape indicates a change in torque, and a phase shift of a static sine-shape indicates a level of a constant torque.

The invention claimed is:

1. A method of determining torsional deformation in a drivetrain in a wind turbine, wherein the drivetrain includes a first shaft and a second shaft connected by a gearbox providing a difference between a first rotational speed of the first shaft and a second rotational speed of the second shaft, the method comprising:
   generating a first signal based at least in part on the first rotational speed,
   generating a second signal based at least in part on the second rotational speed,
   generating a third signal based at least in part on both the first signal and the second signal, and
   determining torsional deformation based on a comparison of the third signal to one of a reference value and a reference signal.

2. The method according to claim 1, where the torsional deformation is based on a ratio between the first signal and the second signal.

3. The method according to claim 1, further comprising detecting a change in a frequency of the third signal.

4. The method according to claim 1, further comprising detecting a phase shift in the third signal.

5. The method according to claim 1, wherein the comparison of the third signal to one of the reference value and the reference signal is carried out continuously.

6. The method according to claim 1, wherein one or both of the first signal and the second signal are determined as an average of a plurality of measurements.

7. The method according to claim 1, wherein one or more of the first signal, the second signal, and the third signal is filtered.

8. The method according to claim 1, further comprising:
   a first step of determining, at a first point in time, a first ratio of the first rotational speed to the second rotational speed in the form of the first signal,
   a second step of determining, at a second point in time, a second ratio of the first rotational speed to the second rotational speed in the form of the second signal,
   a third step of providing a value representing a difference between the first ratio and the second ratio in the form of the third signal, and
   a fourth step of comparing the value with one of the reference value and the reference signal.

9. The method according to claim 8, wherein the first step through the fourth step are repeated continuously.

10. The method according to claim 1, wherein at least one of the first rotational speed and the second rotational speed is determined by an instrument that generates pulses related to shaft rotations.

11. The method according to claim 1, wherein one or more of the first signal, the second signal, and the third signal is determined during power production by the wind turbine.

12. A wind turbine comprising:
   a drivetrain comprising a high speed shaft and a low speed shaft that are connected by a transmission providing a nominal ratio between a first shaft rotational speed of the high speed shaft and a second shaft rotational speed of the low speed shaft; and
   a controller configured to perform an operation of determining torsional deformation in the drivetrain, the operation comprising:
      generating a first signal based at least in part on the first rotational speed,
      generating a second signal based at least in part on the second rotational speed, and
      generating a third signal based at least in part on both the first signal and the second signal, and
      determining torsional deformation based on a comparison of the third signal to one of a reference value and a reference signal.

13. The wind turbine according to claim 12, wherein the reference signal is one or both of the first signal and the second signal.

14. The wind turbine according to claim 12, wherein the reference value is a nominal ratio between the first shaft rotational speed of the high speed shaft and the second shaft rotational speed of the low speed shaft.

15. The method according to claim 1, wherein the reference signal is one or both of the first signal and the second signal.

16. The method according to claim 1, wherein the reference value is a difference between the first rotational speed of the first shaft and the second rotational speed of the second shaft.

17. The method according to claim 8, wherein the reference signal is one or both of the first signal and the second signals.

18. The method according to claim 8, wherein the reference value is based at least in part on a difference between the first rotational speed of the first shaft and the second rotational speed of the second shaft.

* * * * *